(12) United States Patent
Donikian

(10) Patent No.: US 11,041,725 B2
(45) Date of Patent: Jun. 22, 2021

(54) SYSTEMS AND METHODS FOR ESTIMATING THE MOTION OF AN OBJECT

(71) Applicant: Navisens, Inc., San Francisco, CA (US)

(72) Inventor: Ashod Donikian, San Francisco, CA (US)

(73) Assignee: NAVISENS, INC., San Francisco, CA (US)

(*) Notice: Subject to any disclaimer, the term of this patent is extended or adjusted under 35 U.S.C. 154(b) by 0 days.

(21) Appl. No.: 14/648,894

(22) PCT Filed: Dec. 3, 2013

(86) PCT No.: PCT/US2013/072926
§ 371 (c)(1),
(2) Date: Jun. 1, 2015

(87) PCT Pub. No.: WO2014/089119
PCT Pub. Date: Jun. 12, 2014

(65) Prior Publication Data
US 2015/0316383 A1    Nov. 5, 2015

(30) Foreign Application Priority Data

Dec. 3, 2012 (AU) .................................. 2012905248

(51) Int. Cl.
*G01C 21/16* (2006.01)
*G01C 22/00* (2006.01)
(Continued)

(52) U.S. Cl.
CPC ......... *G01C 21/165* (2013.01); *G01C 22/006* (2013.01); *G06K 9/00335* (2013.01); *G06K 9/6281* (2013.01)

(58) Field of Classification Search
CPC .................................................. G01C 21/165
See application file for complete search history.

(56) References Cited

U.S. PATENT DOCUMENTS

| 6,522,266 B1 | 2/2003 | Soehren et al. |
| 2004/0054470 A1* | 3/2004 | Farine ............... G01C 5/06 342/357.3 |

(Continued)

FOREIGN PATENT DOCUMENTS

| EP | 1 865 286 A2 | 12/2007 |
| JP | 2009-205282 A | 9/2009 |

(Continued)

OTHER PUBLICATIONS

PCT, International Search Report and Written Opinion, PCT/US2013/072926, dated Mar. 27, 2014.

(Continued)

*Primary Examiner* — Imran K Mustafa
(74) *Attorney, Agent, or Firm* — Orrick, Herrington & Sutcliffe LLP

(57) ABSTRACT

A method for estimating the motion, orientation, position, and trajectory of an object, comprising acquiring sensor data, estimating an attitude of the object, estimating an altitude of the object, extracting a feature, classifying a motion, selecting a motion model, and estimating a motion parameter. Systems for executing the method are also disclosed.

14 Claims, 8 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 2005/0007386 A1* | 1/2005 | Berson | G01C 23/00 345/633 |
| 2005/0033200 A1 | 2/2005 | Soehren et al. | |
| 2006/0089786 A1 | 4/2006 | Soehren | |
| 2007/0250261 A1* | 10/2007 | Soehren | G01C 21/16 701/510 |
| 2008/0077326 A1 | 3/2008 | Funk et al. | |
| 2008/0214360 A1* | 9/2008 | Stirling | A61B 5/1038 482/9 |
| 2009/0326679 A1* | 12/2009 | Iba | G06N 3/004 700/29 |
| 2010/0191391 A1* | 7/2010 | Zeng | G01S 13/723 701/1 |
| 2011/0029465 A1* | 2/2011 | Ito | G06K 9/00335 706/12 |
| 2011/0106418 A1* | 5/2011 | van der Merwe | G01C 21/12 701/532 |
| 2011/0190972 A1 | 8/2011 | Timmons et al. | |
| 2012/0209505 A1 | 8/2012 | Breed et al. | |
| 2012/0303271 A1* | 11/2012 | Chowdhary | A61B 5/0022 701/433 |
| 2013/0169679 A1* | 7/2013 | Su | G09G 5/377 345/633 |
| 2014/0142800 A1* | 5/2014 | Zeng | G05B 23/02 701/30.6 |

FOREIGN PATENT DOCUMENTS

| | | |
|---|---|---|
| JP | 2012-161402 A | 8/2012 |
| KR | 10-2005-0097288 A | 10/2005 |
| KR | 10-2009-0061019 A | 6/2009 |
| KR | 10-2012-0005701 A | 1/2012 |

OTHER PUBLICATIONS

Notification of the First Office Action, Chinese Patent Application 201380072165.3.
Extended European Search Report, Application 13859821.4.
Korean Office Action, Application 10-2015-7016913.
Notification of Provisional Rejection, Korean Patent Application No. 10-2015-701693.
Korean Office Action, Korean Patent Application 10-2015-7016913.
The Second Office Action, Chinese Patent Application No. 201380072165.3.

* cited by examiner

SYSTEMS AND METHODS FOR ESTIMATING THE MOTION OF AN OBJECT

TECHNICAL FIELD

In one broad aspect, the present disclosure relates to determining a motion of an object.

BACKGROUND

Mobile self-contained sensor systems, which are unable to directly observe the environment, inevitably suffer from sensor drift and, consequently, experience an accumulated error in localisation. Additionally, many localisation systems, which are able to directly observe the environment or make measurements from sensors distributed within the environment, are error prone due to: the nature of the measurement characteristics of the sensors employed (e.g., radio frequency (RF) measurements and building materials); interference or obstructions within the environment of operation (e.g., building layout, obstruction of laser and camera field of view due to crowding, changes in lighting levels, poor Global Positioning Systems (GPS) satellite coverage in urban environments); and/or poor data association with observed landmarks or features within the environment of operation (e.g., for feature-based/landmark-based localisation and mapping). These problems are compounded by the use of low-cost sensors which are noisy and suffer from inherent problems and measurement inaccuracies.

A variety of systems are known that can be used to track mobile objects (e.g., mobile assets) to obtain a positioning, tracking and/or trajectory estimate of a mobile object, such as GPS, inertial, and non-inertial sensor devices. Although GPS is a useful tracking system for outdoor tracking applications, a number of limitations exist when applying GPS to indoor and urban navigation or tracking. For example, in indoor environments and in close proximity to buildings, the line of sight of GPS satellites may be substantially obscured, and GPS signals can be highly attenuated. With weakened signals, GPS receivers have difficulty receiving GPS signals and calculating accurate position information.

Inertial tracking systems typically obtain readings from sensors, such as gyroscopes and accelerometers to estimate the relative path of objects. Inertial systems, however, can accumulate large errors over time due to factors such as drift in sensor bias, internal offsets, poor sensitivity, non-linearity, and measurement limitations of the sensors, as well as limitations of the location determining methods (e.g., algorithms) implemented by such systems. Additionally, the size and cost requirements to track objects may necessitate the use of less expensive and robust inertial sensors, potentially increasing drift in the system.

Signal analysis methods that use signals from different reference points to compute the location of objects can be unfeasible due to the need to install a number of transmitter/receiver devices at various tracking locations, and can have large instantaneous errors due to the multi-path effects of signals traveling through various building materials.

As another example, while the use of magnetic field sensors may provide an accurate detection of a heading angle in the absence of magnetic interference, data acquired from these devices often may be inaccurate in buildings due to interference from the building structure, electric lines, and other local magnetic sources.

Accordingly, there is a need for an improved method, system, computer program product, and/or computer readable medium of instructions, which addresses, or at least ameliorates, one or more of the aforementioned problems inherent in the prior art.

The reference in this disclosure to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

In one broad aspect, the present disclosure relates to determining a position, motion, velocity, attitude, trajectory, pathway or the like of an object. In one embodiment, a method and/or system is provided to determine a position, trajectory, pathway or the like of an object using a sensor system, where the object could be moving in an environment for which an absolute or suitably accurate position of the object may not be directly or reliably obtained by the sensor system. In another embodiment, there is provided a method and/or system of estimating the position, motion, velocity, attitude, and/or trajectory of an object based on combining inertial navigation, feature extraction, and motion classification.

Reference to an "object" should be interpreted broadly and could include, for example, a mobile asset, an article, a robot, a vehicle, a person, an animal, any type of target, a mobile or cellular telephone, a passive object, etc.

BRIEF DESCRIPTION OF THE DRAWINGS

Example embodiments should become apparent from the following description, which is given by way of example only, of at least one preferred but non-limiting embodiment, described in connection with the accompanying figures.

As previously described, it should be noted that the figures are not drawn to scale and that elements of similar structures or functions are generally represented by like reference numerals for illustrative purposes throughout the

DETAILED DESCRIPTION OF THE PREFERRED EMBODIMENTS

Figure 1:
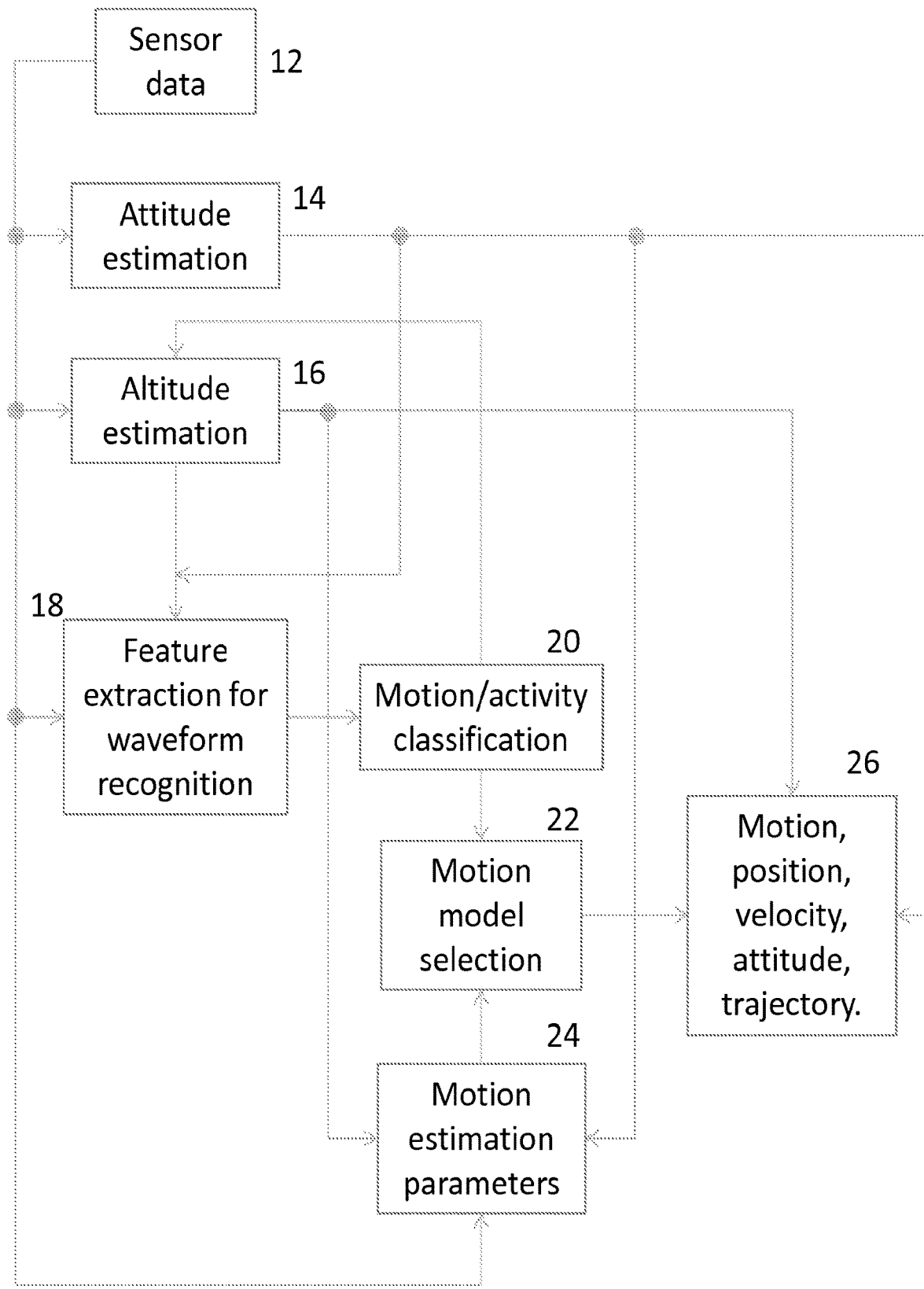
FIG. 1 illustrates a flowchart of an example method for motion detection, motion and activity classification, and estimation of motion, velocity, position, orientation, and trajectory.

In order to overcome the problems associated with low-cost and low-power sensors for feasible location estimation using such sensors, the following framework is proposed:

Referring to FIG. 1 there is illustrated an example method 10 for estimating the motion, orientation, position, and trajectory of an object. Method 10 includes obtaining, at step 12, sensor data from one or more sensors. In a preferred embodiment, one or more sensors are used that facilitate motion measurements, such as inertial sensors and so on.

At step 14, an attitude of the object is determined by way of the sensor data obtained at step 12. In one embodiment, the attitude of the object is determined by fusion of relative and global inertial sensors (e.g., gyroscopes, accelerometers, etc.).

At step 16, an altitude of the object is estimated, preferably by fusion of relative and global sensors (e.g., accelerometers, gyroscopes, barometric pressure). Step 16 may also receive information from the motion classification (i.e., feedback from step 20 discussed below) to improve the altitude estimation.

At step 18, features are extracted from the sensor data obtained in step 12 and prepared for motion classification. The core inputs for feature extraction include the inertial sensor data (e.g., inertial sensor data from accelerometers and gyroscopes; additionally, other data may be included, such as the attitude estimates of step 14 and the altitude estimates of step 16).

At step 20, the features are processed by a classification algorithm (e.g., a neural network, a support vector machine, a Bayesian network, a Naive Bayes classifier, a decision tree, a k-nearest neighbour (KNN) approach, boosting, a Dynamic Bayesian Network (DBN), a Hidden Markov Model (HMM), reinforcement learning, logistic regression, a genetic algorithm, a Gaussian process) to classify the motion and/or activity being performed.

At step 22, a motion model is selected based on the classified motion determined in step 20.

At step 24, motion parameters are estimated from the sensor data of step 12 and/or attitude (step 14) and/or altitude estimates (step 16) and are applied to the motion model (step 22). For example, sensor data may be used to estimate a velocity and/or distance based on the selected motion model, and the velocity and/or distance may be estimated with respect to the attitude and/or altitude.

At step 26, the motion, position, velocity, attitude/orientation, and trajectory are estimated. This step may be performed using one of several techniques, such as by simple dead reckoning or by using a statistical estimator, such as an Extended Kalman Filter (EKF).

Navigation for Objects which May be Manipulated in a Complex Manner

In some embodiments, the sensor(s) being used may not be in constant alignment with respect to the object/asset being tracked. For example, consider the use of a mobile phone/handset or other portable devices on the asset being tracked. In such examples, the device may have varying alignment between the asset (i.e., person) being tracked. The device may be placed in the pocket, may be held up to the ear whilst talking, may be held out in front of the user while in use, etc. Furthermore, such mobile devices may require "always on" location estimation, whereby the location of the device is estimated continuously, such that, when the user uses the device, a location estimate is already available.

In such complex manipulation/alignment embodiments, the process described in FIG. 1 has been extended to make location estimation feasible for mobile objects, devices, and handsets, etc. by using two classification phases: a primary motion classification phase and a motion secondary classification phase. A primary and/or secondary motion classifier may be used to identify the use/alignment of the object, e.g., for a mobile handset, this may include: whether the mobile device is in the pocket of the user; whether the mobile device is placed on the table; whether the mobile device is being held to the left or right ear; whether the mobile device is held out in front of the user in portrait or landscape orientation; etc. The primary classification phase is subsequently followed by a secondary classification phase, which utilises a secondary classifier (e.g., a neural network, a support vector machine, a Bayesian network, a Naive Bayes classifier, a decision tree, a k-nearest neighbour (KNN) approach, boosting, a Dynamic Bayesian Network (DBN), a Hidden Markov Model (HMM), reinforcement learning, logistic regression, a genetic algorithm, a Gaussian process), which is chosen based on the outcome of the primary classifier. For example, the primary classifier may be designed to classify two parent motions: whether the mobile device is being manipulated whilst the user is stationary (e.g., the user is interacting with the device whilst sitting down or standing up, but without moving within the environment) or whether the mobile device is in motion (e.g., it is physically moving within the environment). Accordingly, the most appropriate secondary classifier then may be selected based on the output of the primary classifier: e.g., for a mobile device being held stationary, the secondary classifier is selected to determine how the device is being manipulated (e.g., held face-up, face-down, in portrait mode or landscape mode, etc.), or for a mobile device in motion, the secondary classifier is chosen to determine the alignment of the device whilst in motion (e.g., held in the hand, placed in the pocket, held to the ear, etc.). In these examples, each secondary classifier has a specific task of detecting a subset of motions and is selected based on the output of the primary classifier.

Figure 2:
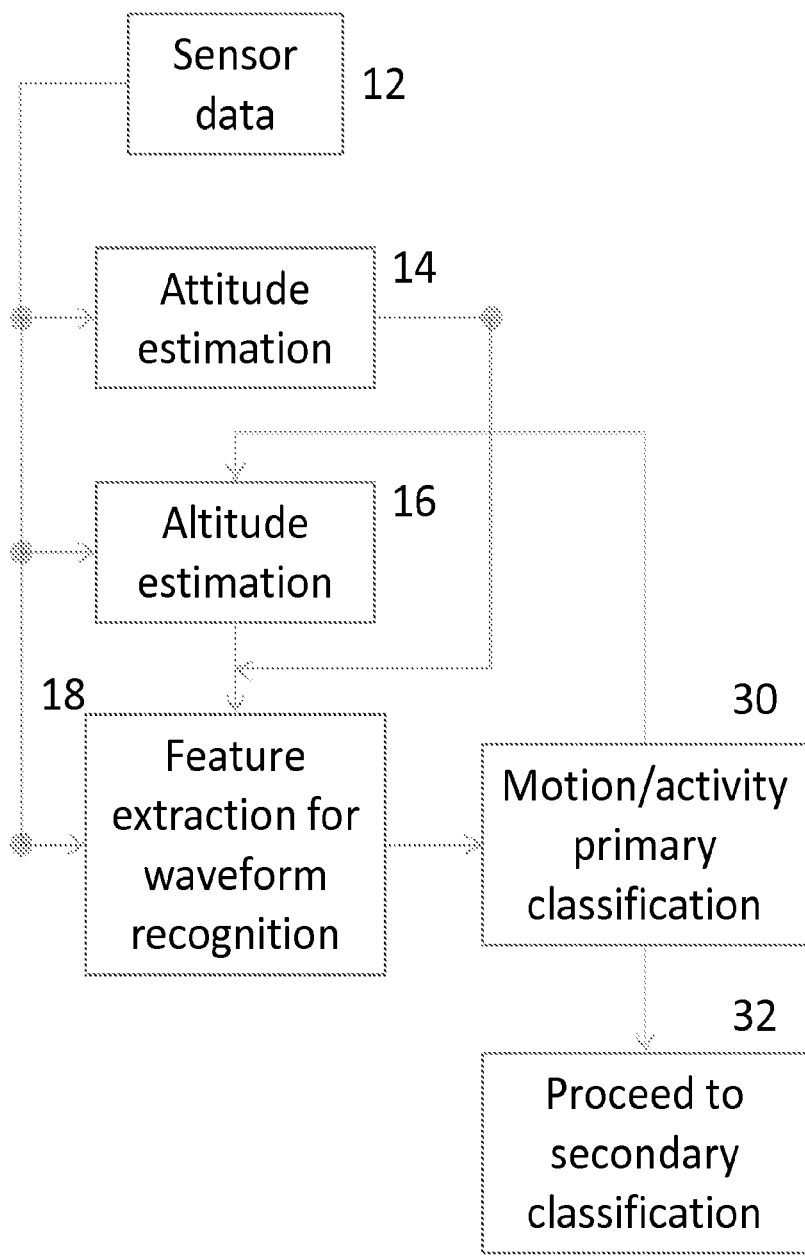
FIG. 2 illustrates a flowchart of an example method for motion detection, motion and activity classification, and estimation of motion, velocity, position, orientation, and trajectory, using a primary classifier cascaded with a secondary classifier.

Referring to FIG. 2, an example method 200 of the primary classification phase is illustrated for estimating the position, motion, attitude, velocity, and/or trajectory of an object. Method 30 includes obtaining, at step 12, the sensor data from one or more sensors. As discussed above, in one embodiment, the one or more sensors include sensors that facilitate motion measurements, such as inertial sensors and so on.

At step 14, the attitude of the object is determined by way of the sensor data obtained in step 12, preferably by fusion of relative and global inertial sensors (e.g., gyroscopes, accelerometers, etc.).

At step 16, the altitude of the object is estimated, preferably by fusion of relative and global sensors (e.g., accelerometers, gyroscopes, barometric pressure). Step 16 may also receive information from the motion classification to improve the altitude estimation.

At step 18, features are extracted from the sensor data and prepared for motion classification. The inputs for feature extraction may include: the raw sensor data (e.g., inertial sensor data from accelerometer(s), gyroscopes(s), barometric altimeter, etc.); the attitude estimates; and the altitude estimates. This will be further described with specific reference to FIG. 4, below.

At step 30, the features are processed by the primary classification algorithm to classify the motion and/or activity (e.g., walking, running, standing, sitting, fidgeting, and so on) being performed.

At step 32, based on the outcome of the primary classifier, the most appropriate secondary classifier is then selected and the secondary classification phase may commence in the same manner as displayed in FIG. 1.

In one embodiment, the primary and secondary classification phases may be performed concurrently, and the secondary classifier may feed information back to the primary classifier to improve its performance.

In one embodiment, there may be several stages of classification and multiple classification phases whereby each classifier may specialise in a specific task (e.g., only classify a subset of motions).

Methodology for Motion Classification and Estimation

Many conventional methods of feature extraction are dependent on the problem and sensors employed (e.g., measuring and classifying brainwaves using an electroencephalography (EEG)). For the purposes of motion estimation, features enable motions to be identified at a high rate (e.g., for dynamic motions), at high complexity, and at high degrees of freedom (e.g., walking in different directions, running, sitting down, lying down, etc). To adequately determine motions in the face of disturbances, the following feature extraction and motion classification is illustrated in FIG. 3.

Figure 3:
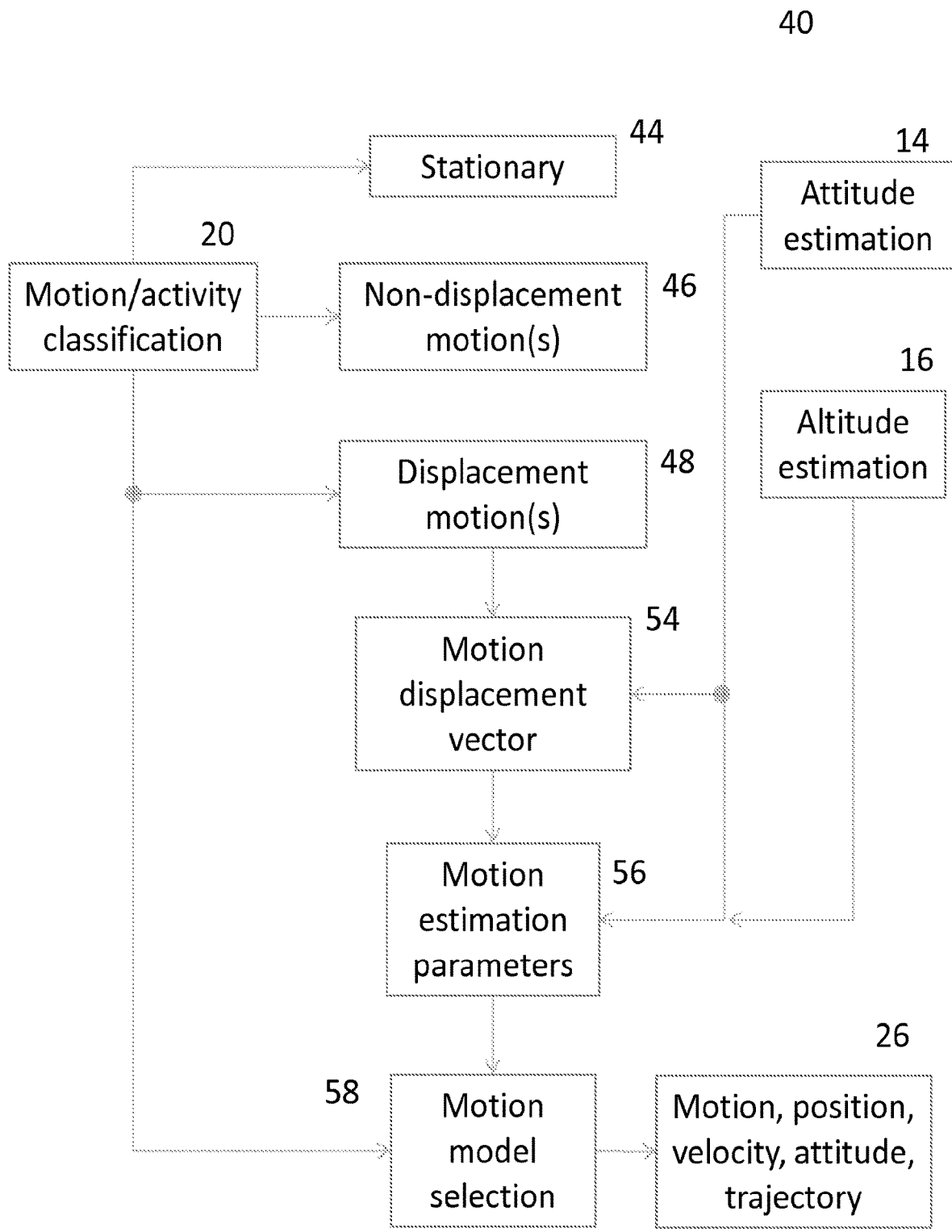
FIG. 3 illustrates a flowchart of an example method for motion classification and estimation of stationary and non-stationary motions.

Turning to FIG. 3, an example method 40 of the motion classification phase is illustrated. Following the motion/activity classification discussed earlier (at steps 20, 30, and/or 32), motions are classified preferably into one of three primary categories: stationary (i.e., where the object is completely still and does not move); non-displacement motion(s) (i.e., those motions which result in disturbances but with no horizontal displacement, e.g., a user fidgeting, sitting down, standing up, etc., a mobile device being manipulated, etc.); and displacement motions (i.e., those motions which result in a horizontal displacement, e.g., walking, running, side stepping, crawling, and other general locomotion activities).

At step 14, attitude estimation is performed regardless of the motion being performed.

At step 16, altitude estimation is performed regardless of the motion being performed.

At the occurrence of a motion with horizontal displacement and when complex motions are being considered, at step 54, a motion displacement vector may be estimated. In one embodiment, this motion displacement vector may be estimated based on the differences and ratios of inertial sensor measurements. The motion displacement vector is fed into the motion estimation parameters as an additional input and provides information about offsets to the motion which may have not been part of the motion classification, for example, walking in a slightly diagonal path, etc.

At step 58, the motion estimation parameters are fed into the motion model which was selected based on the classified motion. This motion model can vary according to the motion being estimated. For example, motion models can include a distance-based motion model, a velocity-based motion model, and a dead-reckoning motion model.

At step 26, the position, motion, velocity, attitude/orientation, and trajectory are estimated as discussed earlier (e.g., step 26 of FIG. 1).

Methodology for Feature Extraction

When processing inertial sensor data using traditional inertial navigation algorithms, minor errors in the sensor readings, for example, due to temperature drift, non-linearity, misalignment, incorrect mounting, and/or attitude estimation errors, etc. can result in extremely large errors in the position estimates, rendering traditional inertial navigation techniques useless for practical applications which are low-cost, low-power, small size, etc.

Figure 4:
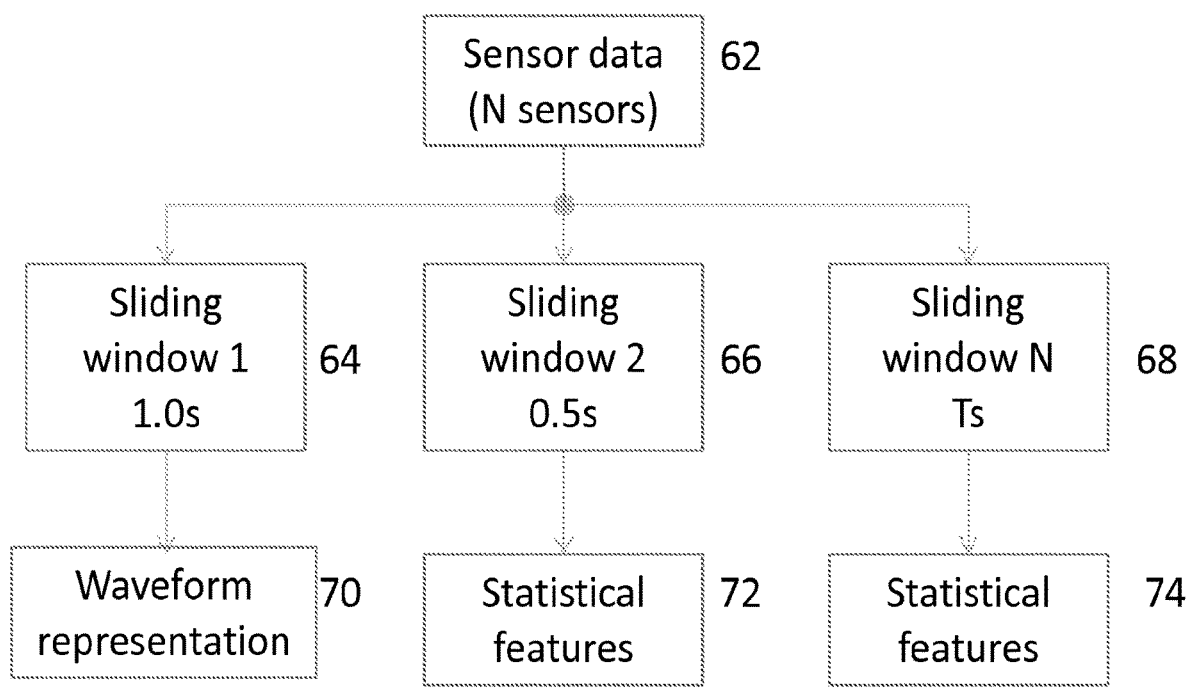
FIG. 4 illustrates a flowchart of an example feature extraction methodology.

The feature extraction of FIG. 4 is based on the principle that each motion performed follows a given pathway in three-dimensional space, and that the performance of inertial sensors has much better short-term accuracy than long-term accuracy. Thus, the feature extraction framework generates features, which can adequately represent the pathway of a given motion over a short period of time. When dealing with a time series of inertial sensor data, the features extracted, which represent those sensor waveforms, will also represent the motion within that time window.

Referring to FIG. 4, an example method 60 of feature extraction is illustrated for motion classification. At step 62, measurements from one or more sensors are acquired. The inputs for feature extraction may include: the raw sensor data (e.g., inertial sensor data from accelerometer(s), gyroscopes(s), barometric altimeter, etc.); the attitude estimates; and the altitude estimates. Such sensor data typically may be acquired from either a combination of discrete single or multi-axis sensor chips or from a single-chip Inertial Measurement Unit (IMU) or from a separate IMU sensing device.

Sensor data is stored within one or more sliding windows 64-68 to generate a time-series of sensor data in preparation for feature extraction. Thus, each sensor is represented by one or more sliding windows of time-series data.

Features may be extracted for each individual sensor from one or more sliding window(s). For example, a shorter sliding window typically provides good dynamic response and is more suited for statistical features, as the corresponding sensor waveform is too short to adequately represent the motion undergone by the sensor. A longer sliding window is suited for waveform representation as it can adequately represent the motion undergone by the sensors and, thus, the object being tracked.

As an advantage, the feature extraction methodology can be applied to any number of sliding windows and sensor types. The final selection of the number of sliding windows and the length of each window is somewhat application specific. For example, when tracking mobile devices, depending on the expected motions, two or three sliding windows ranging in length from 0.5 s to 2.0 s are preferred. The waveform representation methodology can be applied to the longer sliding window to ensure that it captures an adequate representation of the current motion, and additional statistical features can be extracted from the shorter sliding window(s) to ensure that the system had good dynamic response.

In one embodiment, to implement the waveform methodology, a polynomial waveform approximation is used. Thus, the time series of each individual sensor for that sliding window is approximated by the application of a polynomial, and the resulting polynomial coefficients were used as features for classification. Thus, each set of coefficients represent a unique waveform pattern for an individual sensor for a particular motion. Employing a higher-order polynomial may result in over-fitting the time series which would then affect the generality of the technique, whilst a polynomial of very low order cannot adequately represent that motion waveform. In a preferred embodiment, a polynomial order of 5 is used. Alternative waveform approximation techniques may also be used, for example, fitting with Bezier curves.

The polynomial waveform representation is applied to the inertial sensors. Depending on the expected motions and the sensors available within the device (e.g., the device being located or carried such as a mobile phone, a tablet computer, a purpose-specific tracking device), the waveform representation may be applied to one or more axes of the accelerometer(s) and/or one or more axes of the gyroscope(s). In one embodiment, for the representation of complicated motions, the waveform representation is applied to three orthogonal accelerometers and three orthogonal gyroscopes. Thus, up to 6 inertial data time-series are processed by the waveform representation block to output a set of polynomial coefficients, which represent the waveform/motion within the sliding window. In principle a combination of tri-axial accelerometers and gyroscopes should be able to represent any motion in six degrees of freedom (6DOF) using traditional inertial navigation techniques. Such sensors found in consumer and mobile devices are much lower cost than high-end industrial applications. Thus, the waveform representation methodology captures their short-term waveform to represent the motion being performed, whilst removing the need for high-accuracy high-cost sensors and significantly reducing, or eliminating, the requirement for calibration.

To supplement the waveform representation, a shorter window can be used, and statistical features can be extracted, such as: mean; range; time difference between the maximum and the minimum measurements within the sliding window; variance; the root mean square (RMS) value, the energy, the skewness, and the standard deviation. These statistical features on their own are not capable of adequately representing motions; however, they provide a good dynamic response and in conjunction with the polynomial coefficients from the waveform representation allow the classifier to reliably and accurately classify motions to perform location estimation.

Methodology for Integration of Altitude and Motion Measurements to Counteract Drift Common methods of determining altitude include integration of inertial sensors and fusion of inertial sensor data with Global Positioning System (GPS) and/or barometric sensing. However, both of these common methods can exhibit drift and failures. For example, in terms of GPS location estimation, altitude estimates generally depict the least accuracy and GPS measurements can wildly fluctuate when satellites are obstructed or different satellite geometry is used. Additionally, GPS is difficult to function indoors. In terms of barometric measurements, barometers and barometric altitude are sensitive to weather variations and other variations within the environment such as opening and closing doors. To improve altitude estimation, regardless of the type of sensor used, it is much more optimal to combine such measurements with motion measurements.

Figure 5:
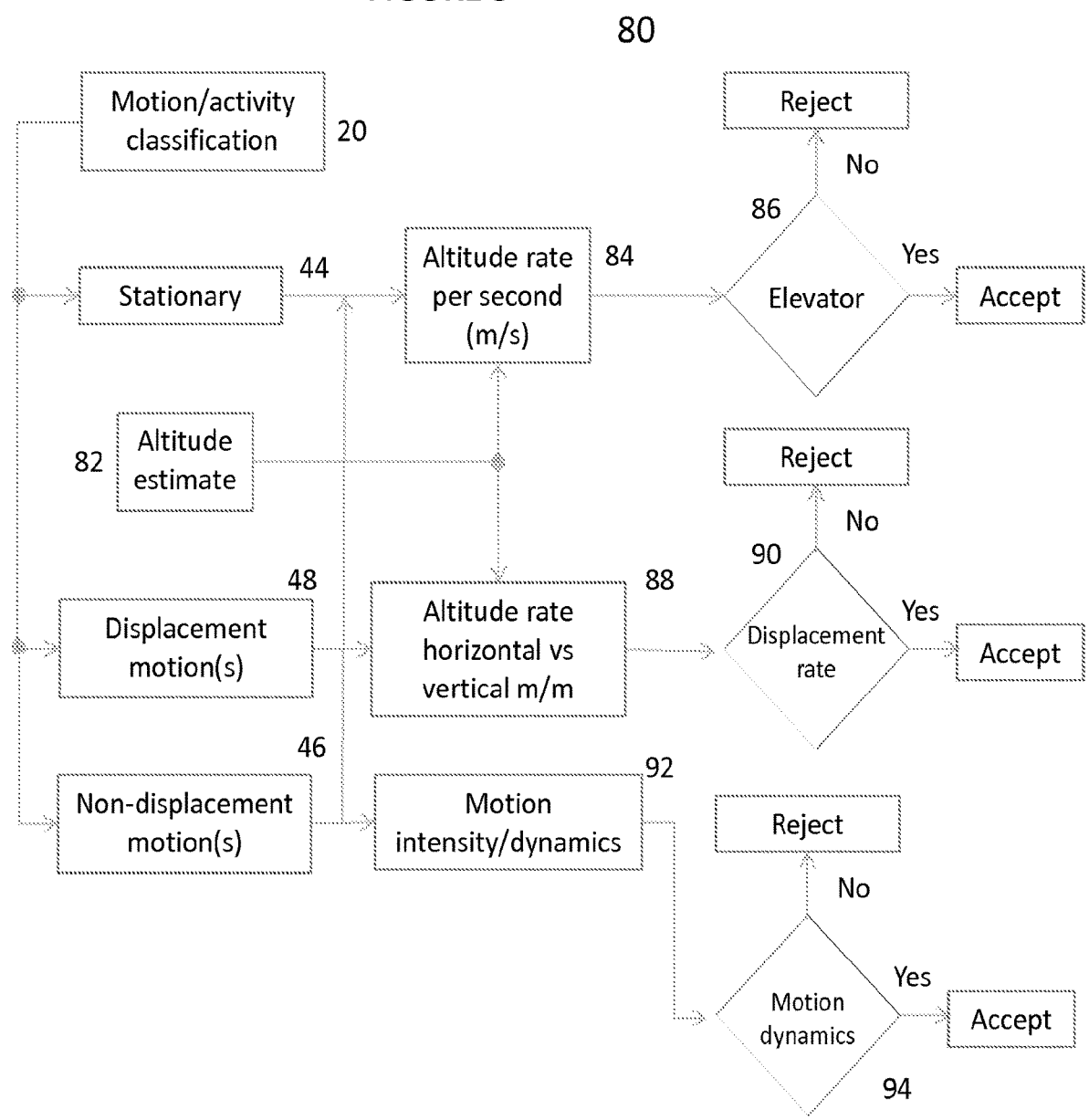
FIG. 5 illustrates a flowchart of an example method for of altitude correction by fusing altitude information with motion measurements.

Referring to FIG. 5, an example method 80 is illustrated for altitude correction by fusing altitude information with motion measurements to constrain drift in sensors (e.g., inertial, barometric sensors, GPS, etc.) by fusing sensor information with information from a motion classifier/motion estimator.

At step 82, sensor data from different sources is acquired and the altitude is estimated using any appropriate technique such as fusion of inertial, barometric, and/or GPS measurements, low-pass filtering, or other techniques. Such sensor data may typically be acquired from either a combination of discrete single or multi-axis sensor chips or from a single-chip Inertial Measurement Unit (IMU) or from a separate IMU sensing device, a GPS receiver, a data or cloud service which stores calibrated measurements At step 20, motion/activity classification is performed and classified into one of the three primary categories of motions: stationary, non-displacement motions, or displacement motions.

At step 44, if a stationary motion is classified, compute the vertical displacement change with respect to time in metres per second, at step 84, using a sliding window of width, which suits the dynamics of the object being tracked. At step 86, if the rate in m/s (which may also be computed in other equivalent units, such as feet/s) matches the vertical displacement rate expected (e.g., if the object is a mobile phone carried by a human and the vertical displacement rate matches that of traveling inside an elevator/escalator), accept the altitude reading. If the rate doesn't match an expected altitude change, reject the altitude reading.

At step 48, if a displacement motion is classified, compute the rate of horizontal displacement with respect to the rate of vertical displacement, at step 88. At step 90, if the rate indicates that the change in altitude corresponds with the object traversing the environment (e.g., if the object is a mobile phone carried by a human, this may correspond with a person walking up or down a staircase) accept the altitude changes. If the rate does not match, reject the altitude changes. In the case of a person traversing a staircase, the vertical displacement rate may be compared to accepted standards, for example, building standards/regulations which indicate the height and width of stairs.

At step 46, if a non-displacement motion is classified, the same course of action is taken as was with step 44. Additionally, a rate of motion intensity/dynamics is computed at step 92, which may be based on processing inertial sensor data and calculating parameters and/or motion/activity classification. At step 94, if the rate indicates that the change in altitude corresponds with the motion the object is performing, accept the altitude changes. If the rate does not match, reject the altitude changes. For example, if the object is a human, such motions may include a user sitting down, standing up, lying down, falling, etc., or an object being picked up, placed down, etc.

Figure 6:
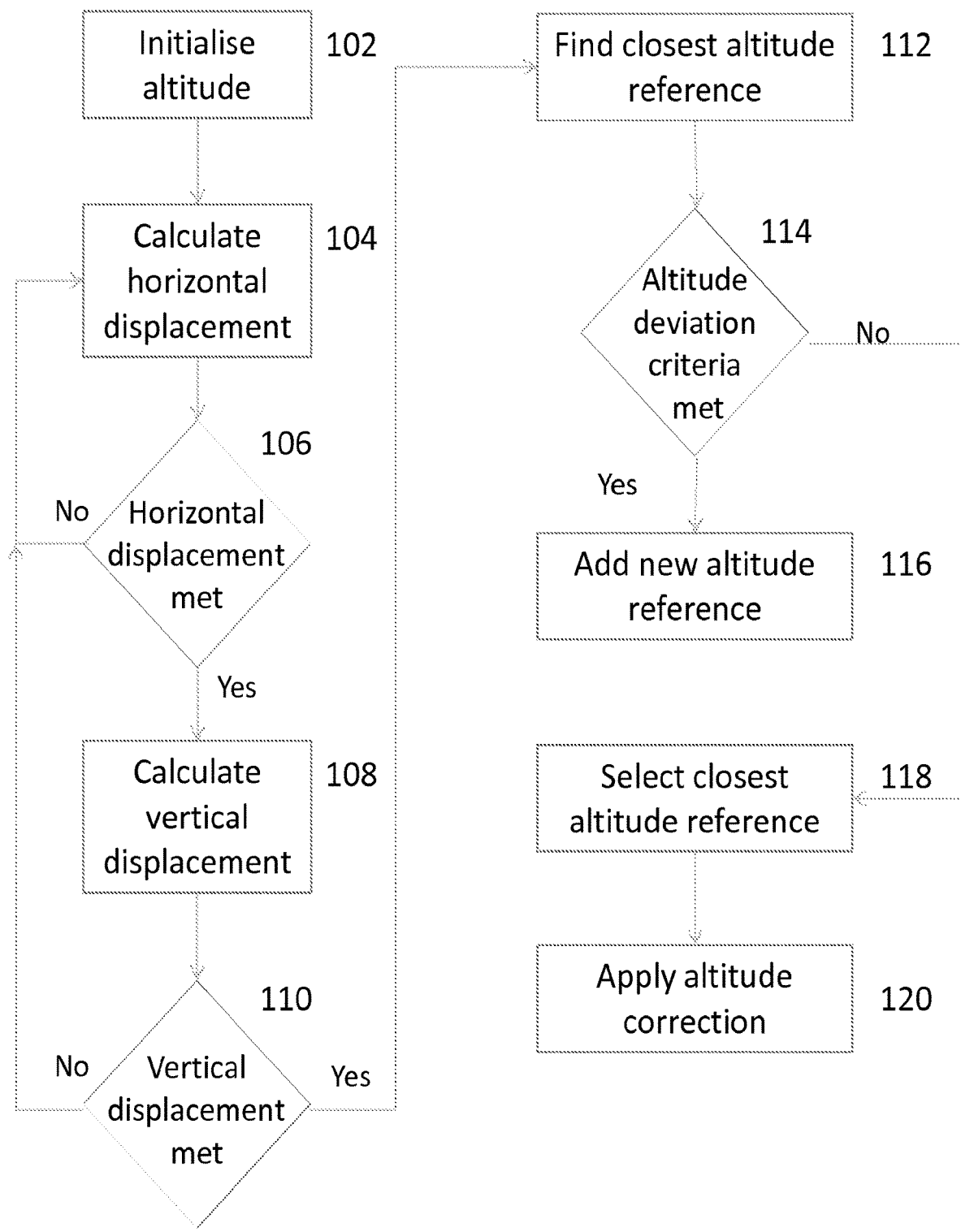
FIG. 6 illustrates a flowchart of an example method of altitude correction by identifying fixed altitude references using motion estimation.

As an additional altitude correction mechanism, referring to FIG. 6, an example method 100 is illustrated of altitude correction using motion estimation and identifying altitude references.

At step 102, initialise the system and add the current altitude (which may be filtered and/or averaged over a period of time for stability) as a reference altitude. Stated in another way, the system is calibrated at the current altitude.

At step 104, compute the horizontal displacement over a fixed period of time chosen to suit the object motion dynamics.

At step 106, check if the horizontal displacement within the selected period of time is above a required amount, also selected with respect to the object dynamics and environment. For example, for a human traversing within a building, a value of 5.0 m may be ideal. If this criteria is not met, go back to step 104 and continue calculating the horizontal displacement and continuously checking if the horizontal distance criteria is met.

If the horizontal displacement criteria is met, at step 108 compute the vertical displacement within the fixed period of time chosen to suit the object motion dynamics and at step 110 check if the vertical displacement (which may be filtered or averaged, etc.) has remained stable. If so, the object/asset can be considered to be in motion on a level surface which is suitable for consideration as a new reference altitude.

At step 112, the closest reference altitude is searched from a database of previous reference altitudes. Note that at the system initialisation, the initial altitude was added as a reference altitude and at the early stages of estimation it may be the only (and thus closest) reference altitude available. At step 114, if the altitude under consideration deviates from the closest reference altitude by more the required difference (chosen to suit the object motion dynamics and the environment), then at step 116 the new altitude reference is stored and added to an altitude reference database and may be used for future altitude correction. If the criteria at step 114 is not met, then at step 118 select the closest altitude reference and at step 120 apply an altitude correction.

As an example, within a multi-level building the required altitude difference may be set close to the height difference between floors. Consider the case of a person walking within a multi-story building. After system initialisation where the first reference altitude is initialised, the user traverses a staircase. Once the user exits the staircase and walks down a corridor or open space and satisfies steps 106-114, the current altitude is added as a new reference altitude at step 116. If the user now walks back down the staircase to the original altitude of the system initialisation, and the user traverses the environment and satisfies steps 106-112 but due to drift does not satisfy step 114, then the closest (initial) reference altitude is selected at step 118 and an appropriate altitude correction applied at step 120.

Note that the altitude correction method may also use a reference database recorded previously and/or obtained via a data/cloud service with calibrated/surveyed information and/or crowd sourced from multiple users, and/or available with the building floor plans, etc.

In an alternative embodiment, visualisation of the 3D environment can be made wherein the altitude reference database may also include the maximum and minimum coordinate span of the user position such that the size of the floor may be estimated and plotted on a visualisation. A shape may be fitted so that the maximum and minimum coordinate spans fit within the shape (e.g., a rectangle may be fitted so that it emulates the shape of the building/environment which is being traversed).

Example Applications: Locating personnel, locating objects, mobile phones and electronic equipment, industrial safety applications, vehicle collision avoidance, locating personnel such as first-responders within urban environments and indoor buildings, indoor mapping and supporting indoor handset location.

Processing or Hardware Systems

Figure 7:
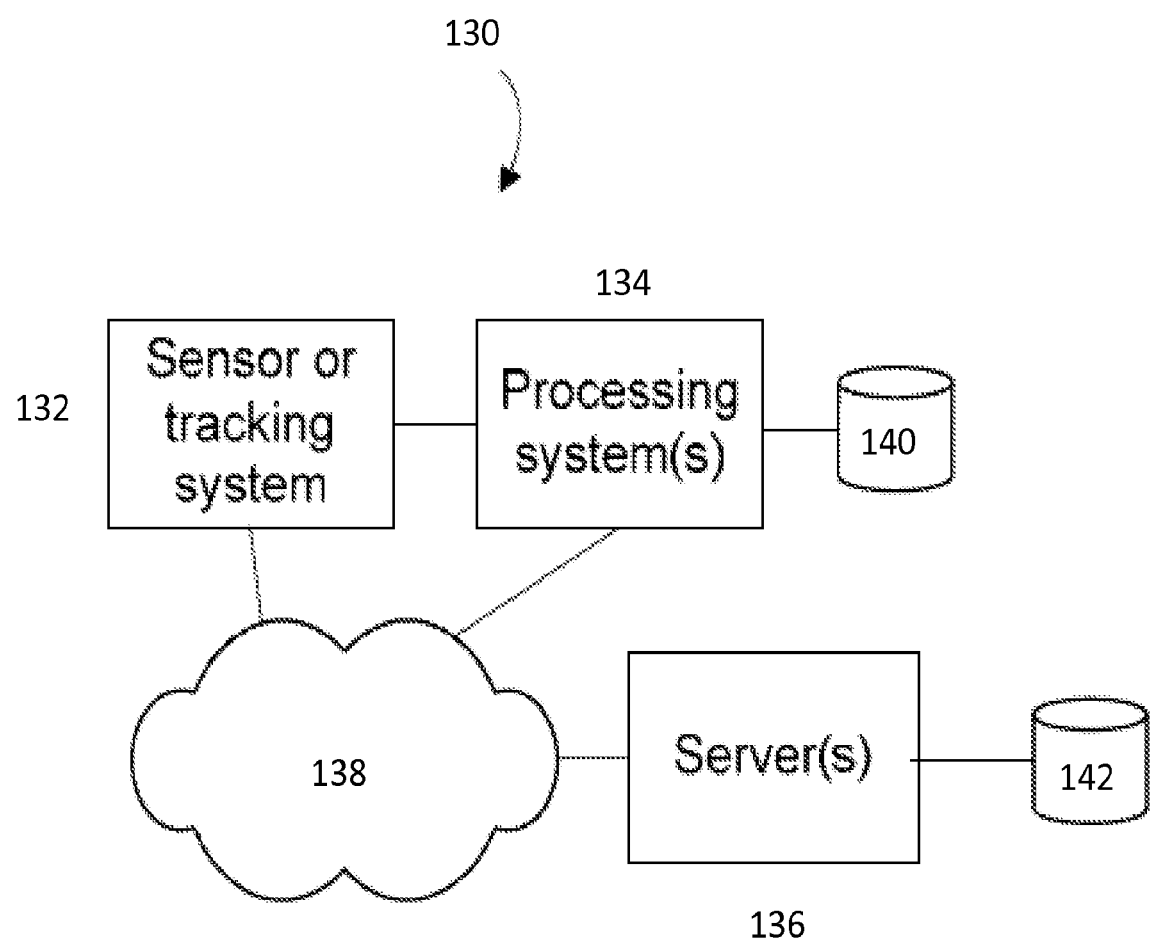
FIG. 7 illustrates an example system that can be utilised to embody or give effect to a particular embodiment.

Referring to FIG. 7, the motion estimation methodology can be implemented using a system 130 including a variety of sensor hardware, processing systems and/or robotic hardware. The sensing systems or hardware may be physically mounted to robotic platforms and vehicles or may be carried by or attached to objects or persons either as a motion estimation/localisation-specific device or integrated with existing technology such as communication equipment including mobile phones and radios, tools and safety equipment, wearable safety equipment and clothing such as vests, boots, helmets, etc. Furthermore, there may be various other industry-specific implementations, for example, integration into the cap lamp commonly used by miners and other industrial personnel. Additionally, the sensing systems or hardware may make use of parasitic power from such platforms or equipment, such as utilising the battery or power supply which is either internal to the equipment (e.g., battery in a mobile phone, radio transceiver, mp3 player, vehicle, etc.) or external to the equipment (e.g., an external battery pack such as those carried by mining personnel and other industrial workers, which may be mounted/attached to the belt or carried in a backpack or integrated into clothing).

Sensors, Tracking Systems or Sensing Hardware 132:

Self-contained sensors can be utilised such as the inertial measurement units (IMUs) available from several manufacturers such as Honeywell®, Crossbow®, xSens®, MEM-Sense®, etc. Inertial measurement units or inertial-based navigation sensors which are assembled with discrete components based on Micro Electro-Mechanical Systems (MEMS) sensors can be utilised for example those manufactured by companies such as AnalogDevices®, InvenSense®, STMicroelectronics®, and which may also consist of magnetic and barometric sensors such as those manufactured by Honeywell® and Freescale® Semiconductor. Such sensors typically combine discrete components of tri-axial acceleration, angular rotation, and magnetic field sensors. Such sensors are included within certain electronic devices such as mobile phones (e.g. the Apple® iPhone® or HTC® One®) or Samsung® Galaxy® or LG® Nexus®, mp3 players (e.g., the Apple® iPod®), and other computing hardware (e.g., tablets such as the Apple® iPad® or Microsoft® Surface®), typically for the purposes of usability, gaming, and supporting the user interface (UI) in terms of tilt/rotation and input detection using accelerometer(s) and/or gyroscope(s) and/or a magnetic compass for heading determination for navigation applications typically combined with GPS or assisted GPS (A-GPS), or for example, fitness/exercise and step/calorie counting pedometer applications such as the Nokia® SportsTracker or Apple® M7 co-processor. Such electronic devices may allow access to the sensor data (e.g., via a wireless interface such as BlueTooth® or Wi-Fi® or a wired interface such as USB) or allow access to the on-board sensing device(s) via an Application Programming Interface (API) and development and execution of software within the internal processor of the device, such that developed algorithms and software may execute internal to the device itself utilising the built-in sensor(s), processor(s), and communication system(s).

Processing systems 134. The methods or processes described herein may be implemented to execute on a processing system 134, that could be part of or separate to sensor system 132, in a variety of different ways. Processing system 134 could store and/or retrieve information or data from a local database 140. For example, as a process responsible for acquiring sensor data, attitude estimation, altitude estimation, feature extraction, motion/activity classification, motion model selection, estimation of motion parameters, and estimation of the motion, position, velocity, attitude, and trajectory.

In a similar manner, methods or processes described herein may be implemented as a remote process executed on an independent system such as server(s) 136 which communicates with a host-system using either wired and/or wireless communication (LAN/WLAN, cellular data radio, etc.), such as network 138. Sensor information or calculated features may be sent to the server(s) at regular intervals. Server(s) 136 can store and/or retrieve information or data from one or more databases 142.

Figure 8:
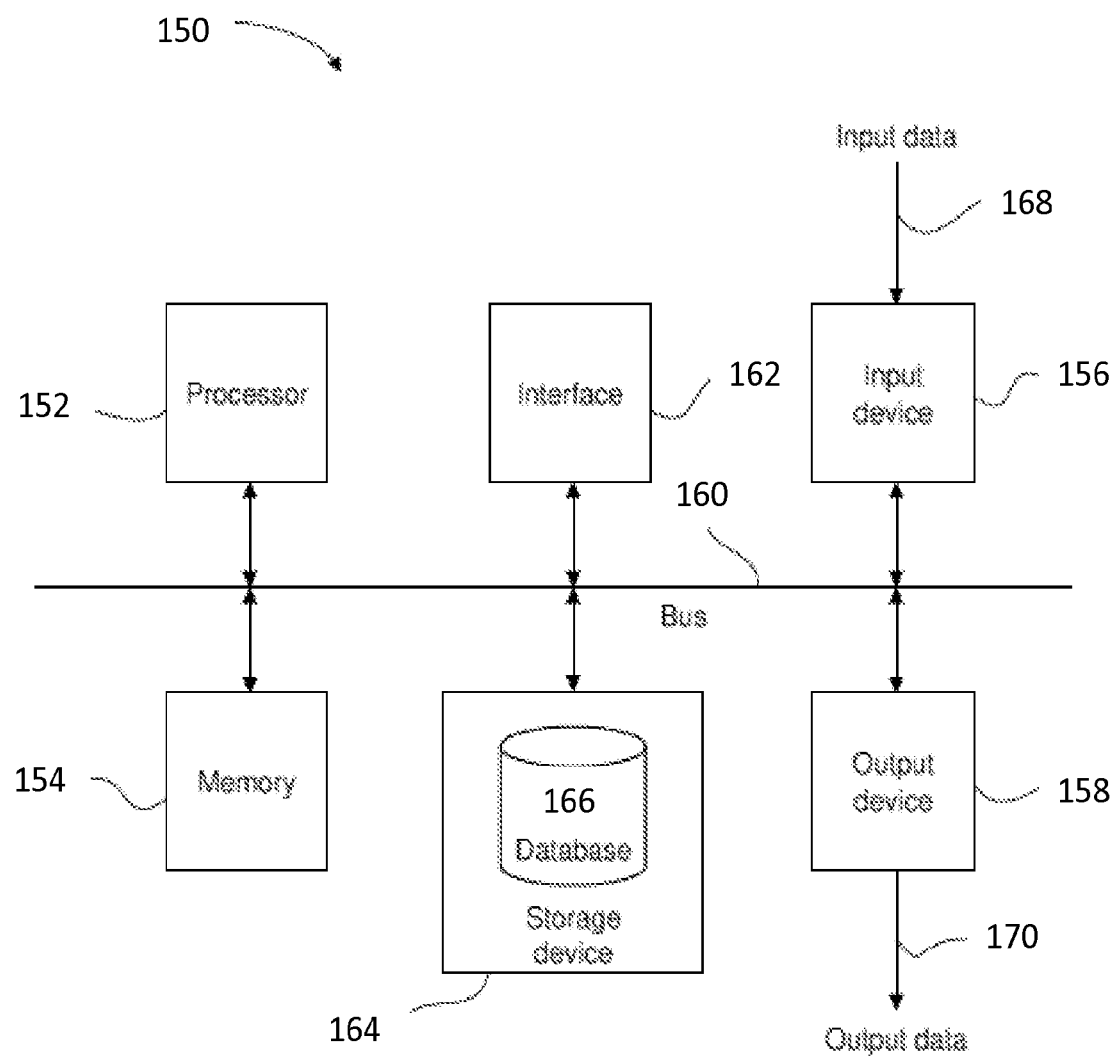
FIG. 8 illustrates an example processing system that can be utilised to embody or give effect to a particular embodiment.

A particular embodiment of the present invention can be realised using a processing system, which could be integrated with, local or remote to the sensing system, an example of which is shown in FIG. 8. In particular, processing system 150 generally includes at least one processor 152, or processing unit or plurality of processors, memory 154, at least one input device 156 and at least one output device 158, coupled together via a bus or group of buses 160. In certain embodiments, input device 156 and output device 158 could be the same device. An interface 162 can also be provided for coupling the processing system 150 to one or more peripheral devices, for example interface 162 could be a PCI card or PC card. At least one storage device 164 which houses at least one database 166 can also be provided. The memory 154 can be any form of memory device, for example, volatile or non-volatile memory, solid state storage devices, magnetic devices, etc. The processor 152 could include more than one distinct processing device, for example to handle different functions within the processing system 150.

Input device 156 receives input data 168 and can include, for example, a data receiver or antenna or wireless data adaptor, etc. Input data 168 could come from different sources, for example sensed data in conjunction with data received via a network. Output device 158 produces or generates output data 170 and can include, for example, a display device, a port for example a USB port, a peripheral component adaptor, a data transmitter or antenna such as a wireless network adaptor, etc. Output data 170 could be distinct and derived from different output devices. A user could view data output, or an interpretation of the data output, on, for example, a monitor or using a printer. The storage device 164 can be any form of data or information storage means, for example, volatile or non-volatile memory, solid state storage devices, magnetic devices, etc.

In a networked information or data communications system, a user has access to one or more terminals which are capable of requesting and/or receiving information or data from the sensing system. In such a communications system, a terminal may be a type of processing system, computer or computerised device, mobile or cellular telephone, mobile data terminal, portable computer, Personal Digital Assistant (PDA), etc. An information source can be provided to be in communication with the sensor system and can include a server, or any type of terminal, that may be associated with one or more storage devices that are able to store information or data, for example in one or more databases residing on a storage device.

In use, the processing system 150 is adapted to allow data or information to be stored in and/or retrieved from, via wired or wireless communication means, the memory or the at least one database 166. The interface 162 may allow wired and/or wireless communication between the processing unit 152 and peripheral components that may serve a specialised purpose. The processor 152 receives instructions as input data 168 via input device 156 and can display processed results or other output to a user by utilising output device 158. More than one input device 156 and/or output device 158 can be provided. It should be appreciated that the processing system 150 may be any form of terminal, specialised hardware, or the like. The processing system 150 may be a part of a networked communications system. Processing system 150 could connect to network, for example the Internet or a LAN, WAN, or cellular data radio. Input data 168 and output data 170 could be communicated to other devices via the network.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention. The present invention may take the form of an entirely hardware embodiment, an entirely software embodiment, firmware, or an embodiment combining software and hardware aspects.

Particular embodiments can be further described by the following points:

1) A method of estimating the position, motion, velocity, attitude, and/or trajectory of an object based on an approach of combining inertial navigation, feature extraction, and motion classification to overcome the deficiencies of low-cost and low-power sensors, combining the stages of:
   a. Acquiring sensor data
   b. Attitude estimation
   c. Altitude estimation
   d. Feature extraction
   e. Motion classification
   f. Motion model selection
   g. Motion parameter estimation 2) A method of implementing navigation for devices which may require multiple stages of motion classification and estimation and the application of different estimation modes, comprising the steps of:
   a. Performing a primary motion/activity classification.
   b. Performing a secondary classification with the secondary classifier and/or estimation parameters based on the outcome of the first motion/activity classification 3) A method of motion and location estimation whereby motions are broken down into three primary categories:
   a. Stationary (e.g. a device which is placed on a table, a person sitting or standing still).
   b. Non-displacement motion(s) (e.g. an object which is being manipulated, a person fidgeting).
   c. Displacement motions(s) (e.g. moving a device, walking, running, side stepping, crawling, and other general locomotion activities, etc).

4) A method of motion and location estimation using a classification algorithm and a feature extraction technique which aims to represent the waveform of the motion such that the re-created waveform can be identified with the original motion:
   a. With a polynomial or similar representation aimed at re-creating the motion pathway in space undertaken by the sensors within a given time-frame.
   b. With one or more sliding windows which process the sensor data.
   c. With additional supporting statistical features depending on the nature of the motion dynamics and object type.

5) A method of altitude correction by fusing altitude information with motion measurements:
   a. Determining whether the object being monitored is performing one of the three primary categories of motions: stationary, non-displacement motions, or displacement motions.
   b. During stationary and non-displacement motions:
      i. Calculate the vertical displacement rate with respect to time;

ii. Compare the vertical displacement rate to a profile of acceptable vertical displacement rates with respect to time;
iii. Reject altitude changes which don't meet an acceptable vertical displacement profile;
c. During displacement motions:
i. Compute the vertical displacement rate with respect to the horizontal displacement;
ii. Compare the vertical displacement rate to a profile of acceptable vertical displacement rates with respect to horizontal displacement;
iii. Reject altitude changes which don't meet an acceptable vertical displacement rate;
d. During non-displacement motions:
i. Determine the motion dynamics to determine if the user is performing a motion which requires vertical displacement.
ii. Accept changes in altitude.
iii. After an elapsed period of time, if the altitude does not return to the previous altitude, correct the altitude for drift.

6) A method of altitude correction by identifying fixed altitude references:
a. Initialise the system at start-up by setting the current altitude which may be filtered and/or pre-processed.
b. After traversing an elapsed distance of horizontal locomotion, check if the altitude has remained stable.
c. If true, compare the altitude to the closest reference altitude within the database.
d. If the altitude deviates from the closest reference altitude by the required amount, store the altitude as a new altitude reference which may be used for future corrections.
e. If the altitude deviates from the closest reference altitude by less than the required amount, select the existing closest reference altitude from the database and apply a correction to the altitude.
f. If required, previous altitude estimates may also be corrected.
g. If required, the altitude reference database may also be updated to include the maximum and minimum coordinate span of the user horizontal position.

7) A method of visualising three dimensional environments:
a. For every reference altitude available, set the plot altitude (z-coordinate)
b. Plot a shape with vertices set at the maximum and minimum x and y coordinates measured.

8) A method of visualising motion/activity and trajectory:
a. The trajectory is plotted in two or three dimensions
b. The trajectory colour/pattern is varied with motion/activity measurements and sensor measurements.
c. The trajectory colour/pattern is varied with external measurements such as heart rate, etc.

9) A method for estimating the motion of an object, comprising:
a. extracting a feature of the object from acquired sensor data;
b. classifying the motion of the object based on the extracted feature;
c. selecting a motion model based on the classified motion; and
d. estimating a motion parameter based on the acquired sensor data.

10) The method of (9) above, wherein said extracting the feature of the object includes:
a. acquiring the acquired sensor data from one or more sensors disposed on the object;
b. estimating an attitude of the object based on the acquired sensor data;
c. estimating an altitude of the object using the acquired sensor data;
d. extracting the feature of the object from at least one of the acquired sensor data, the estimated attitude, and the estimated altitude.

11) The method of (10) above,
a. wherein said classifying the motion of the object determines at least one of the motion of the object and an activity being performed by the object, the motion optionally being one of a stationary motion, a non-displacement motion, and a displacement motion, and
b. wherein said estimating the motion parameter is based on at least one of the acquired sensor data, the estimated attitude, and the estimated altitude.

12) The method of any one of the above, wherein said acquiring the sensor data comprises acquiring the sensor data from an inertial sensor, acquiring the sensor data from a gyroscope, acquiring the sensor data from an accelerometer, acquiring the sensor data from an inertial measurement unit, and/or acquiring the sensor data from a barometric altimeter.

13) The method of any one of the above, wherein said estimating the attitude of the object includes fusing of relative and global sensor data selected from said one or more sensors, and
a. wherein said estimating the altitude of the object optionally includes:
b. fusing the relative and global sensor data acquired from said one or more sensors; or
c. low-pass filtering of the acquired sensor data; or
d. receiving information from said motion classifying to feedback for said estimating the altitude of the object.

14) The method of any one of the above, wherein said classifying the motion of the object uses a classification technique selected from the group consisting of a neural network, a support vector machine, a Bayesian network, a Naive Bayes classifier, a decision tree, a k-nearest neighbour (KNN) approach, boosting, a Dynamic Bayesian Network (DBN), a Hidden Markov Model (HMM), reinforcement learning, logistic regression, genetic algorithms, and a Gaussian process.

15) The method of any one of the above, further comprising selecting a motion model based on the classified motion.

16) The method of any one of the above, wherein said estimating the motion parameter of the object includes estimating a velocity of the object and/or a distance traveled by the object based on said selected motion model.

17) The method of any one of the above, wherein said selecting a motion model comprises selecting a distance-based motion model, selecting a velocity-based motion model, and/or selecting a dead-reckoning motion model.

18) The method of any one of the above, wherein said classifying the motion of the object includes at least one of a primary motion classification phase for determining a primary classifier and a secondary motion classification phase for determining a secondary classifier based on the primary classifier.

19) The method of any one of the above, wherein at least one of the primary classifier and the secondary classifier is selected from the group consisting of walking, running, sitting, standing, fidgeting, how a device being disposed on the object is being manipulated, and alignment of the device relative to the object.

20) The method of any one of the above, further comprising:
   a. estimating a motion displacement vector at the occurrence of the motion of the object having horizontal displacement, said estimating being based on differences and ratios of the acquired sensor data and using said motion displacement vector to account for offsets in motions not considered during said classifying.

21) The method of any one of the above, further comprising storing the acquired sensor data in one or more sliding windows to generate a time-series of sensor data in preparation for said extracting the feature.

22) The method of any one of the above, further comprising:
   a. calibrating the one or more sensors to a current altitude reading of the object.

23) The method of any of the above, further comprising:
   a. checking whether the current altitude is within a predetermined altitude reference;
   b. correcting the current altitude if said current altitude is within the predetermined altitude reference; and
   c. adding the current altitude as an altitude reference.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for estimating a motion of an object located on an asset, comprising:
   extracting a feature of the object from acquired sensor data stored within one or more sliding windows, each window being defined by a length, the acquired sensor data being acquired via one or more sensors disposed on the object;
   classifying the motion of the object based on the extracted feature, the classified motion determining the length of each sliding window;
   selecting a motion model based on the classified motion;
   estimating a motion parameter based on the acquired sensor data; and
   estimating the motion of the object by feeding the motion parameter into the motion model; and
   generating a time series of sensor data based on the one or more sliding windows of acquired sensor data, wherein said extracting further comprises,
   wherein said classifying includes determining whether the asset is stationary or traveling to distinguish between non-displacement motions and displacement motions and how the object moves relative to the asset to determine an alignment of the asset relative to the object,
   wherein said extracting the feature of the object includes:
   acquiring the acquired sensor data from the one or more sensors disposed on the object;
   estimating an attitude of the object based on the acquired sensor data independently of said classifying the motion;
   estimating an altitude of the object using the acquired sensor data;
   extracting the feature of the object from at least one of the acquired sensor data, the estimated attitude, and the estimated altitude, and
   generating one or more coefficients of a waveform approximation fitted to the time-series of sensor data to provide an approximation thereof, wherein the generated coefficients represent a unique waveform pattern for a selected sensor used for said classifying the motion of the object.

2. The method of claim 1,
   wherein said classifying the motion of the object determines at least one of the motion of the object and an activity being performed by the object, the motion being at least one of a stationary motion, a non-displacement motion, and a displacement motion, and
   wherein said estimating the motion parameter is based on at least one of the acquired sensor data, the estimated attitude, and the estimated altitude.

3. The method of claim 1, wherein said acquiring the sensor data comprises at least one of acquiring the sensor data from an inertial sensor, acquiring the sensor data from a gyroscope, acquiring the sensor data from an accelerometer, acquiring the sensor data from an inertial measurement unit, and acquiring the sensor data from a barometric altimeter.

4. The method of claim 1, wherein said estimating the attitude of the object includes fusing of relative and global sensor data selected from said one or more sensors, and
   wherein said estimating the altitude of the object includes at least one of:
   fusing the relative and global sensor data acquired from said one or more sensors;
   low-pass filtering of the acquired sensor data; and
   receiving information from said motion classifying to feedback for said estimating the altitude of the object.

5. The method of claim 1, wherein said classifying the motion of the object uses a classification algorithm selected from the group consisting of a neural network, a support vector machine, a Bayesian network, a Naive Bayes classifier, a decision tree, a k-nearest neighbour (KNN) approach, boosting, a Dynamic Bayesian Network (DBN), a Hidden Markov Model (HMM), reinforcement learning, logistic regression, genetic algorithms, and a Gaussian process.

6. The method of claim 1, wherein said estimating the motion parameter of the object includes estimating at least one of a velocity of the object and a distance travelled by the object based on said selected motion model.

7. The method of claim 1, wherein said selecting the motion model comprises at least one of selecting a distance-based motion model, selecting a velocity-based motion model, and selecting a dead-reckoning motion model.

8. The method of claim 1, wherein said classifying the motion of the object includes at least one of a primary motion classification phase for determining a primary classifier and a secondary motion classification phase for determining a secondary classifier based on the primary classifier.

9. The method of claim 8, wherein at least one of the primary classifier and the secondary classifier is selected from the group consisting of walking, running, sitting, standing, fidgeting, how a device being disposed on the object is being manipulated, and alignment of the device relative to the object.

10. The method of claim 1, further comprising:
estimating a motion displacement vector at the occurrence of the motion of the object having horizontal displacement, said estimating being based on differences and ratios of the acquired sensor data and using said motion displacement vector to account for offsets in motions not considered during said classifying.

11. The method of claim 1, further comprising:
calibrating the one or more sensors to a current altitude reading of the object.

12. The method of claim 11, further comprising:
checking whether the current altitude is within a predetermined altitude reference;
correcting the current altitude if said current altitude is within the predetermined altitude reference; and
adding the current altitude as an altitude reference.

13. The method of claim 1, further comprising:
estimating an altitude of the object based on the acquired sensor data;
computing, upon said classification, a vertical displacement change of the object;
comparing the vertical displacement change with an expected vertical displacement change associated with a selected activity of the asset;
determining, based on said comparing, whether to accept or reject the estimated altitude.

14. The method of claim 1, further comprising:
estimating an altitude of the object based on the acquired sensor data;
computing, upon said classification, a rate of a horizontal displacement to a vertical displacement of the object;
comparing the rate with an expected ratio of horizontal displacement to vertical displacement associated with a selected activity of the asset;
determining, based on said comparing, whether to accept or reject the estimated altitude.

\* \* \* \* \*